(12) United States Patent
Javit et al.

(10) Patent No.: US 10,941,516 B2
(45) Date of Patent: Mar. 9, 2021

(54) ELECTRICAL HOUSEHOLD APPLIANCE COMPRISING A BASE HAVING A GRAVITY-FED BOILING CHAMBER

(71) Applicant: SEB S.A., Ecully (FR)

(72) Inventors: Maxime Javit, Lyons (FR); Dominique Gelus, Pont-Eveque (FR)

(73) Assignee: SEB S.A.

( * ) Notice: Subject to any disclaimer, the term of this patent is extended or adjusted under 35 U.S.C. 154(b) by 0 days.

(21) Appl. No.: 16/151,816

(22) Filed: Oct. 4, 2018

(65) Prior Publication Data

US 2019/0106835 A1 Apr. 11, 2019

(30) Foreign Application Priority Data

Oct. 5, 2017 (FR) ...................................... 1759366

(51) Int. Cl.
*D06F 69/00* (2006.01)
*B01D 21/00* (2006.01)
(Continued)

(52) U.S. Cl.
CPC ......... *D06F 69/00* (2013.01); *B01D 21/0087* (2013.01); *D06F 75/12* (2013.01);
(Continued)

(58) Field of Classification Search
CPC .......... D06F 69/00; D06F 75/12; D06F 87/00; F22B 1/284; F22B 37/54; B01D 21/087
(Continued)

(56) References Cited

U.S. PATENT DOCUMENTS

| 4,833,298 A * | 5/1989 | Wilkins ................. B44C 7/027 392/399 |
| 2004/0050118 A1* | 3/2004 | Carrubba ................ D06F 73/00 68/222 |
| 2016/0258109 A1* | 9/2016 | Collet .................... D06F 75/14 |

FOREIGN PATENT DOCUMENTS

| CN | 201713711 U | 1/2011 |
| EP | 3 064 640 A1 | 9/2016 |

(Continued)

OTHER PUBLICATIONS

Search Report as issued in French Patent Application No. 1759366, dated Jun. 19, 2018.

*Primary Examiner* — Nathan E Durham
*Assistant Examiner* — Abby M Spatz
(74) *Attorney, Agent, or Firm* — Lerner, David, Littenberg, Krumholz & Mentlik, LLP (57) ABSTRACT

An electrical household appliance includes a base for producing steam having a steam generator including a boiling chamber and a liquid reservoir supplying the boiling chamber by gravity, the liquid flowing by gravity from the reservoir toward the boiling chamber until the liquid level in the boiling chamber reaches an equilibrium level, called the reference level, at which the liquid level in the appliance prevents air from entering the reservoir, the boiling chamber including a steam outlet through which steam can escape toward a work tool, such as a smoothing brush, and a communication opening connected to a pipe having an evacuation opening closed with a removable stopper, wherein the pipe is supplied with liquid from the reservoir via a supply duct that leads to the pipe at the level of an inlet opening provided above a particle-retention cavity arranged in the lower part of the pipe.

10 Claims, 5 Drawing Sheets

(51) Int. Cl.
     *D06F 87/00*    (2006.01)
     *F22B 1/28*     (2006.01)
     *D06F 75/12*    (2006.01)
     *F22B 37/54*    (2006.01)

(52) U.S. Cl.
     CPC .............. *D06F 87/00* (2013.01); *F22B 1/284* (2013.01); *F22B 37/54* (2013.01)

(58) Field of Classification Search
     USPC ........................... 38/14, 77.8, 77.82; 68/222
     See application file for complete search history.

(56) References Cited

FOREIGN PATENT DOCUMENTS

| | | |
|---|---|---|
| EP | 3 088 599 A1 | 11/2016 |
| FR | 2 981 371 A1 | 4/2013 |
| WO | WO 2007/111691 A2 | 10/2007 |
| WO | WO 2009/125263 A1 | 10/2009 |

\* cited by examiner

ELECTRICAL HOUSEHOLD APPLIANCE COMPRISING A BASE HAVING A GRAVITY-FED BOILING CHAMBER

CROSS REFERENCE TO RELATED APPLICATIONS

This application claims priority to French Patent Application No. 1759366, filed Oct. 5, 2017, the entire content of which is incorporated herein by reference in its entirety.

FIELD

This invention relates to an electrical household appliance comprising a base for producing steam having a steam generator comprising a boiling chamber and a liquid reservoir having an outlet opening through which the liquid flows by gravity toward the boiling chamber.

BACKGROUND

From the utility model CN201713711U, we know of an electrical household appliance comprising a base having a boiling chamber and a water reservoir having an outlet opening through which the water flows by gravity toward the boiling chamber. In this type of appliance, the water flows out of the reservoir when the liquid level in the boiling chamber is lower than a reference level at which the liquid level in the appliance prevents air from entering the reservoir.

A disadvantage of such an appliance is that the supply duct connecting the reservoir to the boiling chamber may become progressively clogged with scale deposits, these scale particles going back up the supply duct toward the reservoir when liquid moves back and forth in the supply duct. In fact, in this type of appliance where the reservoir empties until an equilibrium level is reached at which air is no longer able to enter the reservoir, each demand for water from the boiling chamber results in a drop in water in the reservoir, followed by a back-and-forth movement in the supply duct. The progressive clogging of the supply duct eventually causes the appliance to malfunction.

To remedy this disadvantage, the utility model CN201713711U proposes to equip the supply duct with a lateral branch connected to an evacuation duct closed with a removable stopper accessible from outside the base; removal of the stopper allows evacuation of the water and of a portion of the scale contained in the appliance.

However, such an evacuation duct does not guarantee perfect evacuation of the scale particles, as the latter may agglomerate in different areas of the supply duct and not evacuate through a simple draining through the evacuation duct.

SUMMARY

An aspect of the invention is directed to an appliance whose life span is improved by limiting the clogging of the supply duct of the boiling chamber. Another aspect of the invention is directed to an appliance that is especially compact.

An aspect of the invention relates more specifically to an appliance in which the boiling chamber comprises a steam outlet through which steam can escape toward a work tool, such as a smoothing brush, and a liquid communication opening connected to a pipe having an evacuation opening closed with a removable stopper accessible from outside the base.

In an embodiment of the invention, there is provided an electrical household appliance comprising a base for producing steam having a steam generator comprising a boiling chamber and a liquid reservoir supplying the boiling chamber by gravity, the liquid flowing by gravity from the reservoir toward the boiling chamber until the liquid level in the boiling chamber reaches an equilibrium level, called the reference level, at which the liquid level in the appliance prevents air from entering the reservoir, the boiling chamber comprising a steam outlet through which steam can escape toward a work tool, such as a smoothing brush, and a communication opening connected to a pipe having an evacuation opening closed with a removable stopper, wherein the pipe is supplied with liquid from the reservoir via a supply duct that leads to the pipe at the level of an inlet opening provided above a particle-retention cavity arranged in the lower part of the pipe.

Such an appliance has the benefit of including a particle-retention cavity provided below the inlet opening, which collects and traps the scale particles that fall by gravity into the bottom of the pipe and are stirred by the flow of liquid occurring between the boiling chamber and the reservoir during operation of the appliance.

In fact, the shape of the retention cavity is adapted to retain the scale particles and prevent them from returning to the boiling chamber by being carried by the liquid flowing from the inlet opening toward the communication opening.

According to another characteristic of the invention, the cavity includes a longitudinal extremity defined by a transverse wall projecting into the bottom of the pipe.

Such a transverse wall has the benefit of forming an obstacle against the flow of particles from the cavity toward the boiling chamber.

According to another characteristic of the invention, the evacuation opening offers direct access to the cavity, the stopper beneficially defining a longitudinal extremity of the cavity.

Such a characteristic makes it very easy to evacuate the particles trapped in the particle-retention cavity by opening the stopper.

According to another characteristic of the invention, the pipe, seen from the side, has a stair-step or "Z" shape.

According to another characteristic of the invention, the pipe comprises a first segment fluidically connected to the communication opening and a second segment which is axially offset downward relative to the first segment, the second segment containing the particle-retention cavity.

According to another characteristic of the invention, the first and second segments communicate with one another through an opening arranged in the transverse wall defining the longitudinal extremity of the cavity.

According to another characteristic of the invention, the first and second segments communicate with one another through an opening arranged in a wall where the first and second segments are arranged one on top of the other.

According to another characteristic of the invention, the first segment extends along the axis of the communication opening.

According to yet another characteristic of the invention, the inlet opening is arranged adjacent to the communication opening, for example less than 7 cm from the latter, in an embodiment.

Such a characteristic has the benefit of making it possible to obtain a compact assembly.

According to another characteristic of the invention, the evacuation opening offers visual access to the inlet opening.

Such a characteristic allows making a visual inspection of the level of clogging of the inlet opening and, where necessary, cleaning this opening using a tool inserted through the evacuation opening.

According to yet another characteristic of the invention, the boiling chamber is arranged inside a tank with a circular contour, the pipe extending along a direction radial to the tank.

According to another characteristic of the invention, the particle-retention cavity receives a removable scale-collecting container.

Such a characteristic allows containing the scale particles in a removable container such that the user can more easily evaluate the quantity of scale collected. He can then adapt the cleaning frequency of the scale-collecting container according to the quantity of scale it collects. In addition, such a scale collector has the benefit of ensuring better ergonomics of use.

According to another characteristic of the invention, a filtration device is provided opposite the inlet opening.

Such a filtration device prevents scale particles from the boiling chamber from being sent through the supply duct, thus preventing the progressive clogging of the latter.

In an embodiment, the filtration device will be provided upstream of the inlet opening in the direction of flow from the boiling chamber toward the supply duct.

According to another characteristic of the invention, the filtration device is provided above the particle-retention cavity.

Such a characteristic makes it possible to collect in the cavity the scale particles that break away from the filtration device when the liquid flows from the reservoir toward the boiling chamber.

According to another characteristic of the invention, the filtration device is a filtration grate with calibrated openings.

According to another characteristic of the invention, the filtration device is carried by the scale-collecting container.

According to another characteristic of the invention, the filtration device is carried by the pipe.

BRIEF DESCRIPTION OF THE DRAWINGS

The aspects and benefits of this invention will be more fully understood in consideration of the following description of several particular embodiments of the invention presented as non-restrictive examples, by referring to the attached drawings in which.

DETAILED DESCRIPTION

Only the elements necessary for understanding the invention have been represented. To facilitate reading of the drawings, the same elements bear the same references from one figure to the next.

Note that in this document, the terms "horizontal," "vertical," "lower," "upper," "front" and "back" used to describe the appliance refer to this appliance when the base of the appliance is resting flat on the ground.

Figure 1:
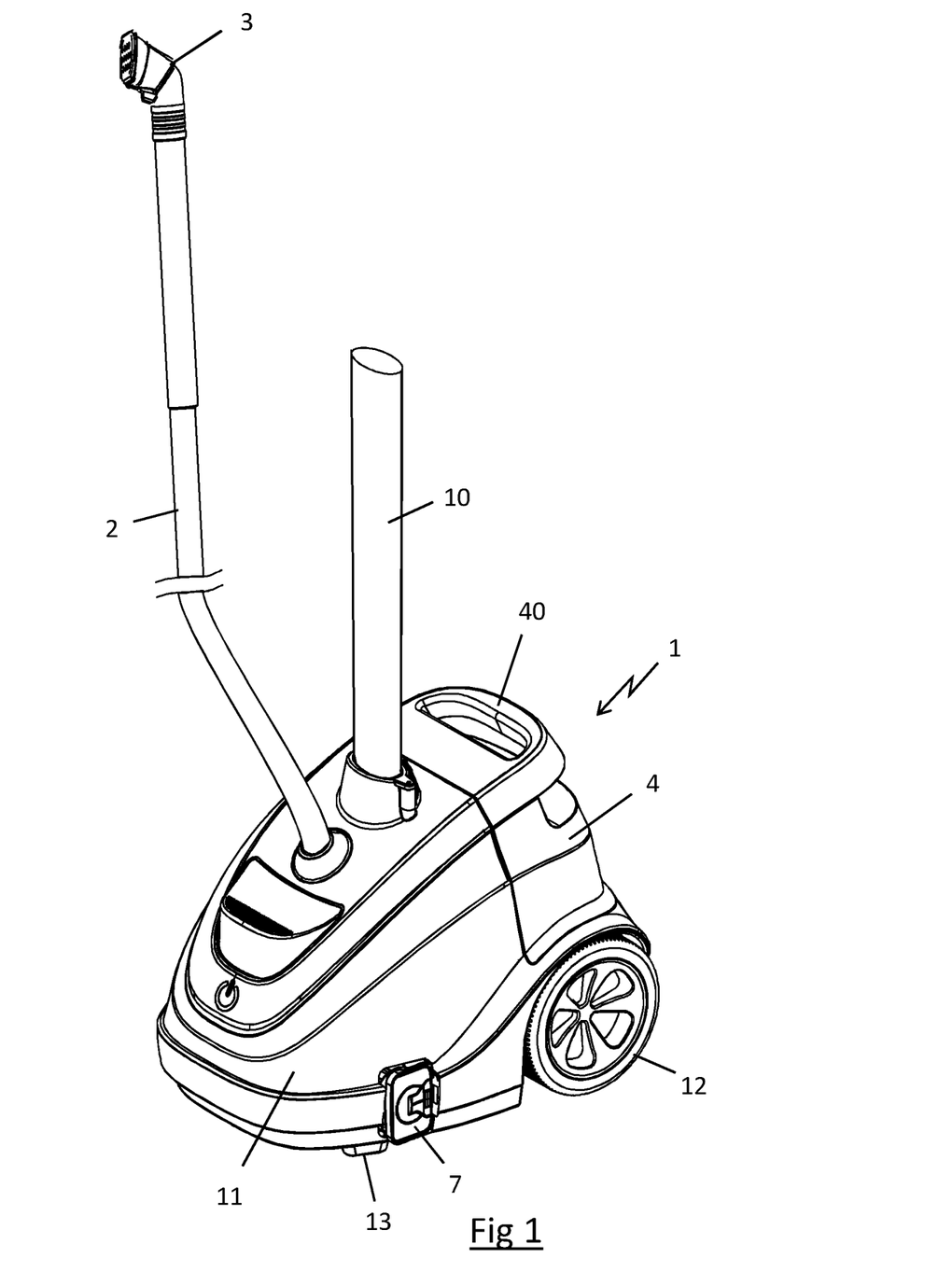
FIG. 1 is a perspective view of an ironing appliance according to a particular embodiment of the invention.

FIG. 1 represents a steam ironing appliance having a base 1 for steam generation connected by a cord 2 to a smoothing brush 3.

This appliance is beneficially equipped with a telescopic pole 10 having an upper extremity conventionally equipped with a hanger, not represented in FIG. 1.

The base 1 comprises a case 11 made of plastic material and receiving two wheels 12, arranged at the back extremity of the base 1, which allow the appliance to be displaced easily by tilting the base 1 backward such that only the wheels 12 remain in contact with the ground. The base 1 also includes two feet 13 which project on the lower surface of the base 1, close to the front extremity of the latter, and on which the front part of the base 1 is supported when the base 1 is resting stably on the ground with the pole 10 arranged substantially vertically, as illustrated in FIG. 1.

The base 1 also includes a removable reservoir 4 arranged above the axle of the two wheels 12, the reservoir 4 having a handle 40 at its upper extremity, facilitating its extraction from the base 1.

Figures 2, 3, 4:
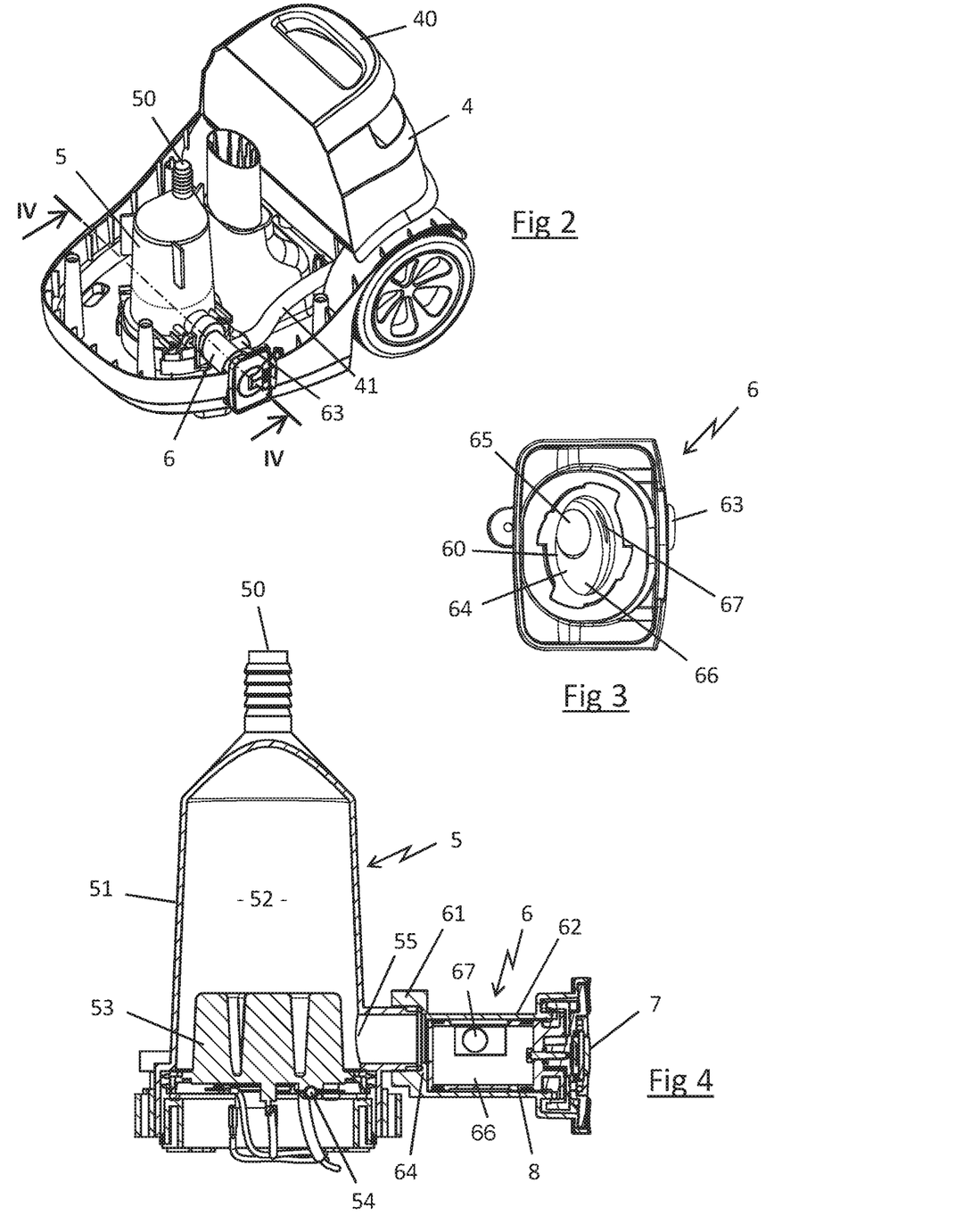
FIG. 2 is a perspective view of the base of the appliance in FIG. 1, with the upper portion of the case removed.
FIG. 3 is a perspective view of the pipe.
FIG. 4 is a longitudinal cross-section view of the tank and the pipe along line IV-IV of FIG. 2.

In accordance with FIG. 2, the base 1 contains a steam generator 5 having a steam outlet opening 50 at its upper extremity, which is connected to the cord 2 leading the steam to the smoothing brush 3.

The steam generator 5 is also connected to a pipe 6 having one extremity equipped with an evacuation opening 60 closed with a removable stopper 7 accessible from one side of the base 1, the pipe 6 comprising a lateral branch 63 connected to a supply duct 41 coming from the reservoir 4.

The reservoir 4 consists of a closed enclosure comprising a bottom wall equipped with an opening closed with a removable stopper, not visible in the figures. The stopper of the reservoir 4 comprises, in a manner known per se, an outlet opening equipped with a valve which closes automatically when the reservoir 4 is removed from the base 1, in order to prevent water from flowing out of the reservoir 4, and which opens when the reservoir 4 is placed on the base 1 so that the water from the reservoir 4 can flow into the supply duct 41. Such a stopper equipped with a valve is similar to the one illustrated in more detail in the patent application WO2007/111691.

In accordance with FIG. 4, the steam generator 5 comprises a substantially frustoconical tank 51 which contains a boiling chamber 52 whose bottom is defined by an aluminum body 53 in which are integrated heating resistors 54, the electrical supply of the heating resistors 54 being controlled in a manner known per se by a circuit, not represented in the figures.

As seen on this figure, the pipe 6 leads to the boiling chamber 52 through a communication opening 55 which is arranged in a side wall of the tank 51, being provided adjacent to the bottom of the boiling chamber 52, the diameter of the communication opening 55 being beneficially approximately 2 cm (+/−10%).

In an embodiment, the pipe 6 comprises a first tubular segment 61, which extends radially to the tank 51, and a second tubular segment 62, which is axially offset downward relative to the first segment 61, the proximal extremity of the second segment 62, the extremity nearest to the tank 51, being closed by a transverse wall 64 comprising an opening 65, visible on FIG. 3, establishing fluidic communication between the inside of the first segment 61 of the pipe 6 and the inside of the second segment 62 of the pipe 6.

The opening 65 is arranged in the upper part of the transverse wall 64, and the lower part of the second segment 62 forms a particle-retention cavity 66 whose distal extremity, the extremity farthest from the tank 51, is closed by the stopper 7. In an embodiment, the lower edge of the opening 65 is aligned with the lower edge of the flow cross section of the first segment 61 such that the particles in the bottom of the first segment 61 can flow freely toward the second segment 62.

In the embodiment example illustrated in the figures, the first segment 61 has a circular flow cross section with a diameter of approximately 2 cm (i.e. +/−10%), and the second segment 62 beneficially has an oblong flow cross section with a height of approximately 3 cm (i.e. +/−10%) and a width of approximately 2 cm (i.e. +/−10%). The opening 65 arranged in the transverse wall 64 beneficially has an oblong shape extending for a height of approximately 1.5 cm (i.e. +/−10%) and a width of approximately 1 cm (i.e. +/−10%).

In an embodiment, the supply duct 41 coming from the reservoir 4 is connected to the pipe 6 by an inlet opening 67 which is arranged in the upper half of the second segment 62, that is, at the height of the communication opening 65 arranged in the transverse wall 64. Thus, when liquid flows from the reservoir 4 toward the tank 51, the flow generated by the liquid flow is essentially located in the upper half of the second segment 62, and the liquid in the lower half of the second segment 62, at the level of the retention cavity 66, then remains substantially stationary.

Figure 5:
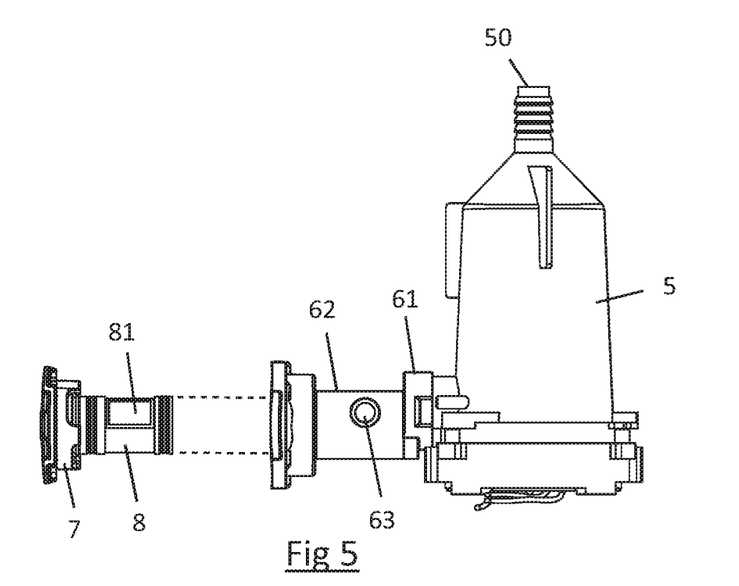
FIG. 5 is a side view of the tank and the pipe with the removable stopper removed from the evacuation opening.
Figure 6:
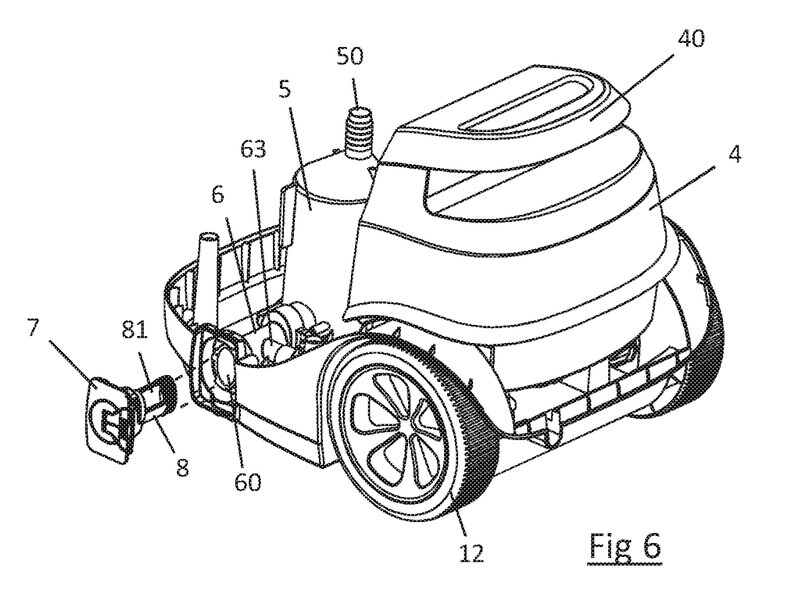
FIG. 6 is another perspective view of the appliance illustrated in FIG. 2 with the removable stopper removed from the evacuation opening.
Figure 7:
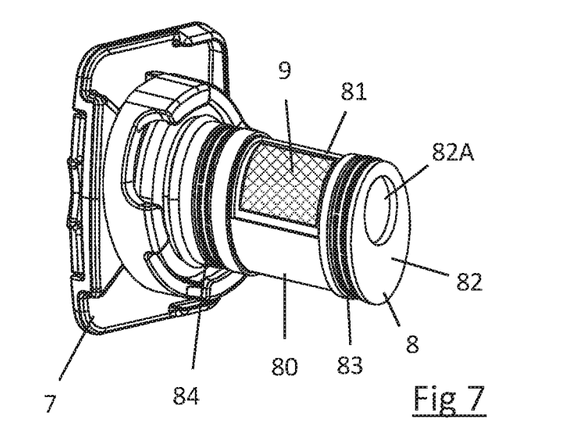
FIG. 7 is a perspective view of the removable stopper equipped with the scale-collecting container.

In accordance with FIGS. 5 to 7, the second segment 62 of the pipe 6 beneficially receives a scale-collecting container 8 which is preferably attached to the removable stopper 7.

The removable stopper 7 is fixed to the extremity of the pipe 6 by a bayonet closure which is known to those skilled in the art and which is, for example, similar to the one described in more detail in the patent application FR 2981371 filed by the applicant.

In the embodiment example illustrated in FIG. 7, the scale-collecting container 8 has a tubular body 80 with an oblong cross section which has a shape complementary to that of the second segment 62, the body 80 comprising a window 81 facing the inlet opening 67 and a longitudinal extremity closed by an extremity wall 82 equipped with an oblong opening 82A corresponding with the opening 65 of the transverse wall 64, the size and shape of the opening 82A of the extremity wall being similar to that of the opening 65 of the transverse wall 64.

In an embodiment, the window 81 is equipped with a filtration grate 9, represented only on FIG. 7, which filters the water flowing through the window 81 and prevents in particular the scale particles, coming from the tank 51 and transported by the flows forming between the tank 51 and the reservoir 4, from accumulating at the inlet opening 67 of the pipe 6.

For example, the filtration grate 9 is made of stainless steel wire and has square openings with sides measuring less than 0.4 mm, and preferably between 0.1 mm and 0.4 mm.

Beneficially, the scale-collecting container 8 has a first gasket 83 and a second gasket 84 arranged on both sides of the window 81, the gaskets 83, 84 extending on the circumference of the body of the container 8 to come into contact with the inner wall of the second segment 62 of the pipe 6.

The first gasket 83 is arranged close to the extremity wall 82 of the container 8 and prevents water circulation outside the scale-collecting container 8.

The second gasket 84 is arranged close to the removable stopper 7 and prevents water from flowing out of the appliance through the removable stopper 7 when the latter closes the pipe 6.

The scale-collecting container 8 may also beneficially be equipped with a gasket arranged on the entire circumference of the window 81 to ensure a watertight connection with the circumference of the inlet opening 67 and prevent water from flowing into the gap between the pipe 6 and the scale-collecting container 8.

The operation of the appliance will now be described.

When the user wishes to use the appliance, he removes the stopper from the reservoir 4 and then fills the latter in an upside-down position, the handle 40 of the reservoir 4 being then oriented downward. When the maximum filling level is reached, the user closes the stopper again and then grasps the reservoir 4 by the handle 40 so as to bring it to the base 1 as illustrated in FIG. 1. When the reservoir 4 is placed on the base 1, the valve integrated in the stopper then opens automatically and the water from the reservoir 4 flows into the supply duct 41, then into the pipe 6 and into the tank 51 until the water level in the appliance, and in particular in the tank 51, reaches a reference level, illustrated in dotted lines on FIG. 2, at which air can no longer enter the reservoir 4.

This reference level, also called equilibrium level, corresponds to the water level at which the water reaches the outlet opening of the reservoir 4, and prevents air from entering the reservoir 4 such that water can no longer flow out of the reservoir 4 until the water level in the appliance drops.

The appliance can then be turned on so as to electrically power the heating resistors 54 in the bottom of the boiling chamber 52. The water in the boiling chamber 52 is then brought to a boil and the steam produced can escape via the cord 2 toward the smoothing brush 3. The evaporation of the water in the boiling chamber 52 then causes the level in the tank 51 to drop and thus causes a decrease in the water level in the appliance, and in particular at the outlet opening of the reservoir 4, such that air is again able to enter the reservoir 4, allowing the water in the reservoir 4 to flow toward the tank 51 until it again reaches the equilibrium level. This water flow from the reservoir 4 toward the boiling chamber 52 occurs in a jerky manner, generating back-and-forth water flow between the tank 51 and the reservoir 4 because of the waves generated by the momentary flow of a quantity of water out of the reservoir 4.

These alternating water movements in the pipe 6 and in the tank 51 then cause the scale particles to be lifted and transported along the pipe 6. When the scale particles reach the second segment 62 of the pipe 6, the latter tend to fall under the effect of gravity, into the bottom of the second segment 62, that is, in the particle-retention cavity 66 and in particular in the scale-collecting container 8 arranged in the cavity 66.

When the water in the pipe 6 moves from the tank 51 toward the reservoir 4, any scale particles that are carried toward the inlet opening 67 are blocked by the filtration grate 9 and are then detached from this filtration grate 9 during the return flow of water toward the tank 51, the particles then falling by gravity into the cavity 66 and thus into the scale-collecting container 8.

Such an appliance thus has the benefit of possessing a particle-retention cavity 66 which efficiently harvests the scale particles initially formed in the boiling chamber 52 and transported into the pipe 6 by the alternating water flows occurring between the reservoir 4 and the tank 51 throughout the functioning of the appliance.

Thus, when the user wishes to perform maintenance on his appliance, for example by being invited to do so by an alarm automatically activated on the appliance, he has only to bring the appliance to the edge of a sink and then open the stopper 7 so that the water still contained in the tank 51 can flow through the pipe 6. When removing the stopper 7, he can at the same time remove the scale-collecting container 8, and view the quantity of scale harvested. He can then rinse the scale-collecting container 8 by making tap water pass through the window 81 and evacuating the contents of the container 8 through the opening 82A of the extremity wall 82.

Through the evacuation opening 60 situated at the end of the pipe 6, the user can also visually verify that no deposit obstructs the inlet opening 67 and if necessary, the user can clean this inlet opening 67 mechanically by inserting a tube brush into the pipe 6 through the evacuation opening 60.

Figure 8:
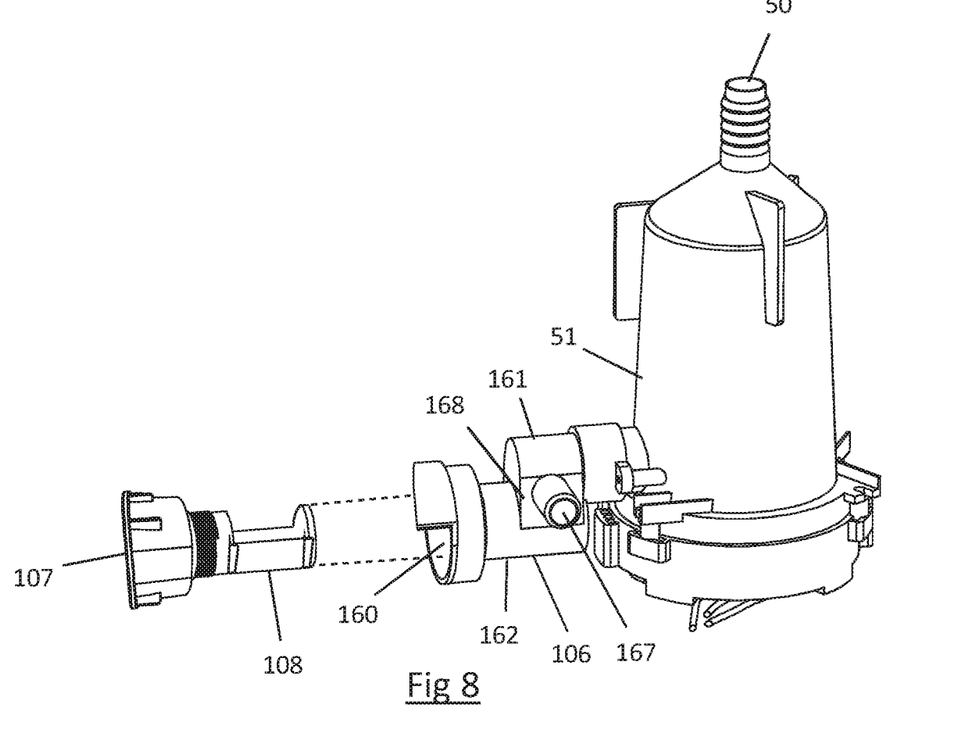
FIG. 8 is a perspective view of a tank equipped with a pipe and a removable stopper according to a second embodiment of the invention; the stopper being represented in a position disconnected from the evacuation opening.
Figure 9:
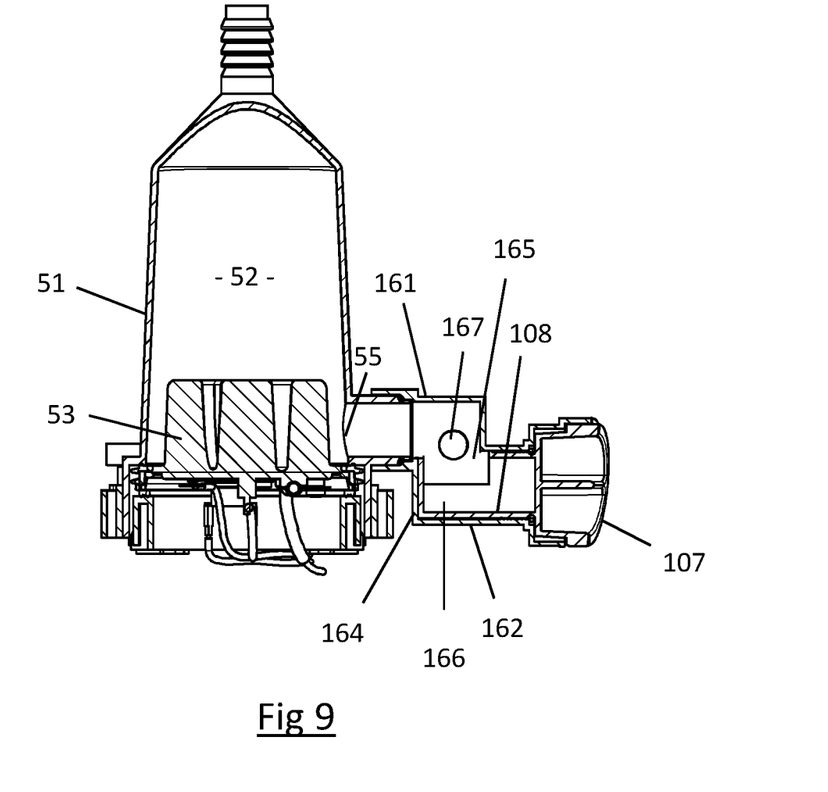
FIG. 9 is a longitudinal cross-section view of the tank and the pipe represented in FIG. 8, with the stopper disconnected from the evacuation opening.

FIGS. 8 and 9 illustrate a second embodiment of the pipe that may equip the tank of the appliance according to an embodiment of the invention. In accordance with these figures, the appliance according to the second embodiment differs from the appliance according to the first embodiment only in the form of the pipe and of the removable stopper/scale-collecting container assembly.

In this second embodiment, the communication opening 55 of the tank 51 is connected to a pipe 106 having a stair-step shape, the pipe 106 having a first tubular segment 161 which extends radially to the tank 51 and a second tubular segment 162 which is axially offset downward relative to the first segment 161, the two segments comprising a connection zone where the two segments 161, 162 are arranged one on top of the other.

The two segments of pipe 106 communicate with one another through an opening 165 connecting the lower part of the first segment 161 with the upper portion of the second segment 162, the connection zone being closed laterally by side walls 168 which extend vertically on each side of the pipe 106.

The supply duct 41 coming from the reservoir 4 is connected to the pipe 106 by an inlet opening 167 which is arranged in the side wall 168 of the connection zone of the pipe 106, beneficially at the height of the first segment 161, such that the inlet opening 167 leads above the communication opening 165 between the two segments 161, 162.

In an embodiment, the inlet opening 167 is equipped with a filtration grate, not represented in the figures, preventing the scale particles from the boiling chamber 52 from going back up toward the supply duct 41.

In accordance with FIG. 9, the second segment 162 has a proximal extremity which is closed by a transverse wall 164 and a distal extremity having an evacuation opening 160 closed by a removable stopper 107 carrying a scale-collecting container 108 having the shape of an open half-cylinder in its upper part.

The operation of the appliance equipped with the tank/pipe assembly according to this second embodiment is the same as that described for the first embodiment; however, the particular construction of the pipe 106 according to the second embodiment has the benefit of making it possible to achieve a particle-retention cavity 166 that can retain particles of a greater volume, thanks to its greater height, while conserving reduced dimensions of the pipe 106, particularly in terms of the width of the appliance. In addition, such a construction allows moving the water inlet opening 167 from the particle-retention cavity 166, which has the benefit of creating a more pronounced calm area at the particle-retention cavity 166, and thus trapping particles in the cavity 166 and in the scale-collecting container 108 even more efficiently.

It will be appreciated that the invention is in no way limited to the embodiments described and illustrated, which have been provided only as examples. Modifications are still possible, in particular from the point of view of composition of the various components or by substitution of equivalent techniques, without departing from the scope of protection of the invention.

Thus, in an embodiment variant not represented, the appliance may not have a scale-collecting container in the pipe. In this embodiment variant, the evacuation of scale particles will take place by simply removing the stopper over a sink and rinsing the contents of the particle-retention cavity by injecting water into it. Such an operation of rinsing the particle-retention cavity may, for example, be performed by filling the reservoir with water and placing it on the appliance prior to opening the stopper, so that the water from the reservoir progressively flows, through the inlet opening, into the particle-retention cavity, then through the evacuation opening, while carrying away the scale particles.

The invention claimed is:

1. An electrical household appliance comprising:
    a base for producing steam having a steam generator comprising a boiling chamber and a liquid reservoir to supply the boiling chamber by gravity, a liquid configured to flow by gravity from the liquid reservoir toward the boiling chamber until a liquid level in the boiling chamber reaches an equilibrium level at which the liquid level in the boiling chamber prevents air from entering the liquid reservoir,
    wherein the boiling chamber comprises a steam outlet through which steam can escape toward a work tool and a communication opening at a first level and connected to a pipe having an evacuation opening closed with a removable stopper, the pipe comprising a particle-retention cavity arranged in a lower part of the pipe and an inlet at a same level as the first level of the communication opening and arranged in an upper part of the pipe above the particle-retention cavity,
    wherein the pipe is configured to be supplied with the liquid from the liquid reservoir via a supply duct that leads to the pipe at the level of the inlet opening,
    wherein the pipe comprises a first segment fluidically connected to the communication opening and a second segment which is axially offset downward relative to the first segment, the second segment containing the particle-retention cavity and the inlet opening.

2. The electrical household appliance according to claim 1, wherein the work tool is a smoothing brush.

3. The electrical household appliance according to claim 1, wherein the particle-retention cavity comprises a transverse wall projecting into a bottom of the pipe at a first longitudinal end of the second segment.

4. The electrical household appliance according to claim 3, wherein the evacuation opening offers direct access to the particle-retention cavity, the stopper arranged at a longitudinal end of the particle-retention cavity distal to the first longitudinal end of the second segment.

5. The electrical household appliance according to claim 1, wherein the inlet opening is provided adjacent to the communication opening.

6. The electrical household appliance according to claim 5, wherein the inlet opening is provided less than 7 cm from the communication opening.

7. The electrical household appliance according to claim 1, wherein the evacuation opening is configured such that the inlet opening is visible to a user from the evacuation opening.

8. The electrical household appliance according to claim 1, wherein the boiling chamber is arranged in a tank having a circular contour and wherein the pipe extends along a radial direction to the tank.

9. The electrical household appliance according to claim 1, wherein the particle-retention cavity receives a removable scale-collecting container.

10. The electrical household appliance according to claim 1, wherein a filtration device is provided facing the inlet opening.

* * * * *